Dec. 30, 1969    A. J. O'BRIEN ET AL    3,486,646
REFUSE VEHICLE
Filed Oct. 19, 1965    5 Sheets-Sheet 1
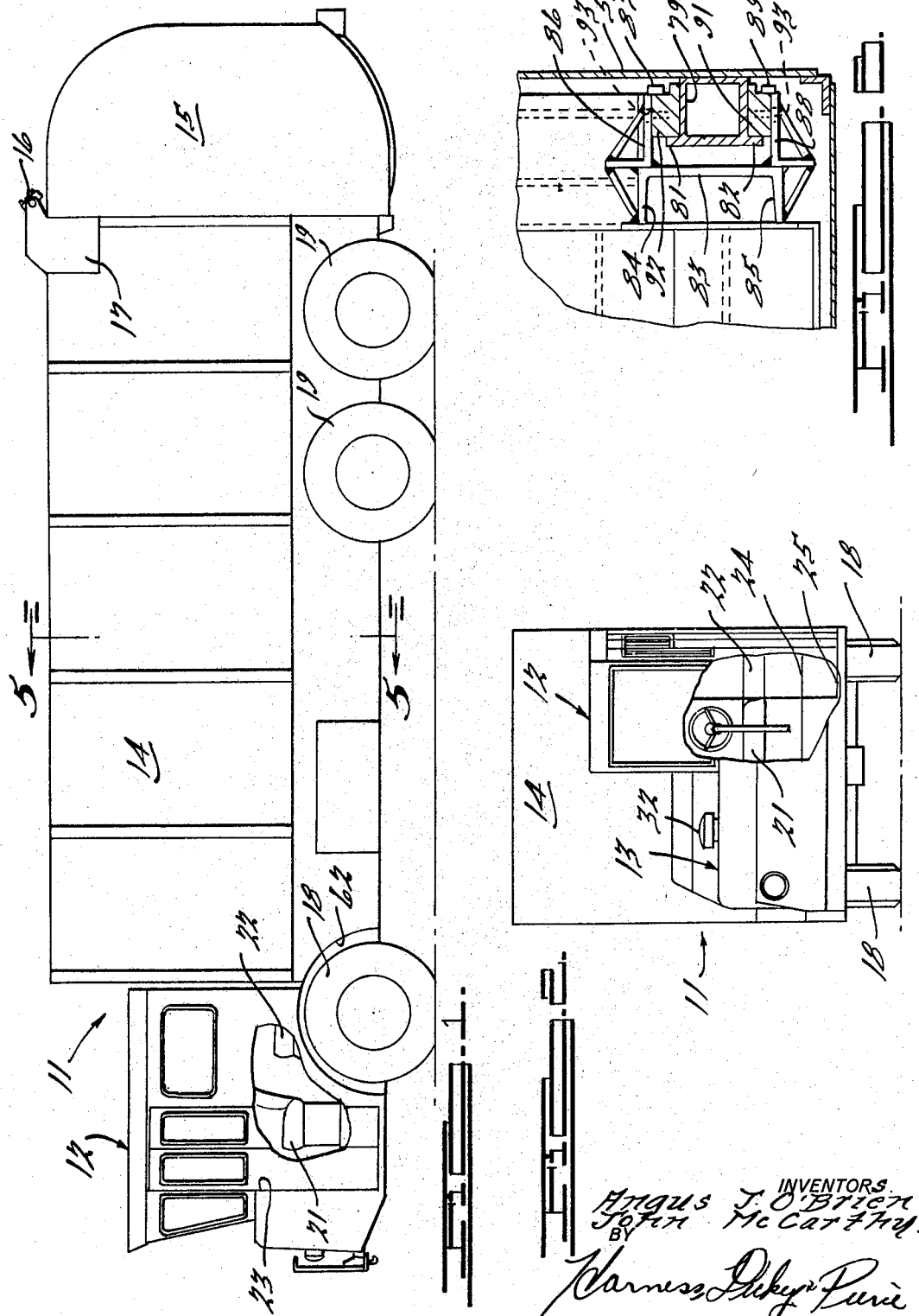
INVENTORS.
Angus J. O'Brien
John McCarthy
BY
Harness Dickey & Pierce
ATTORNEYS.

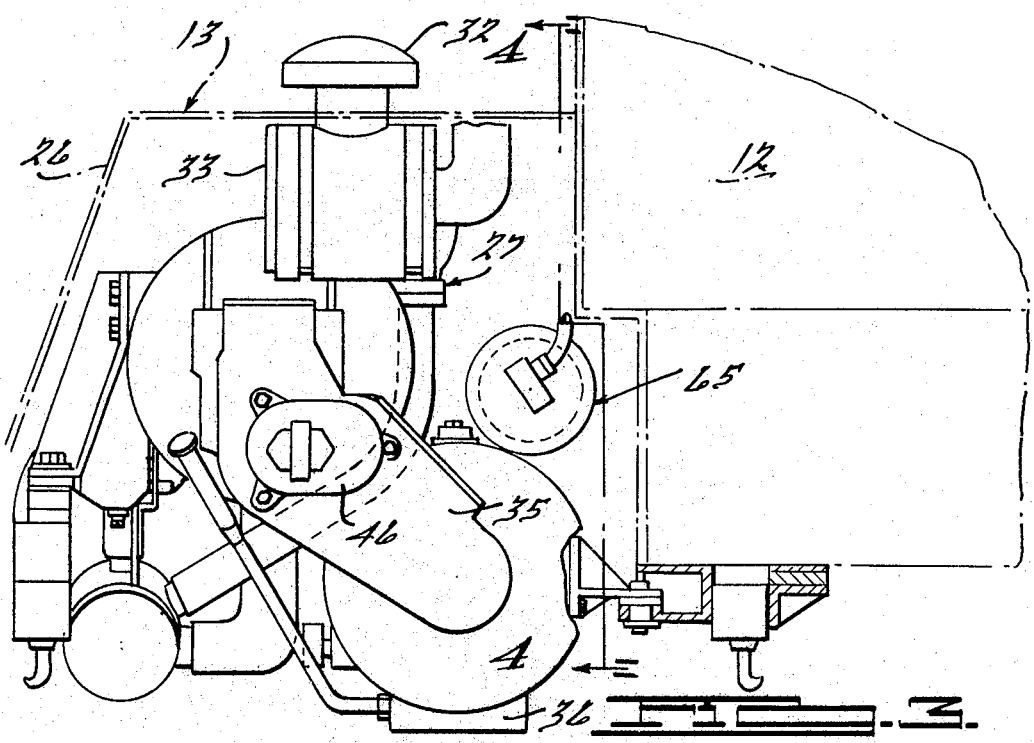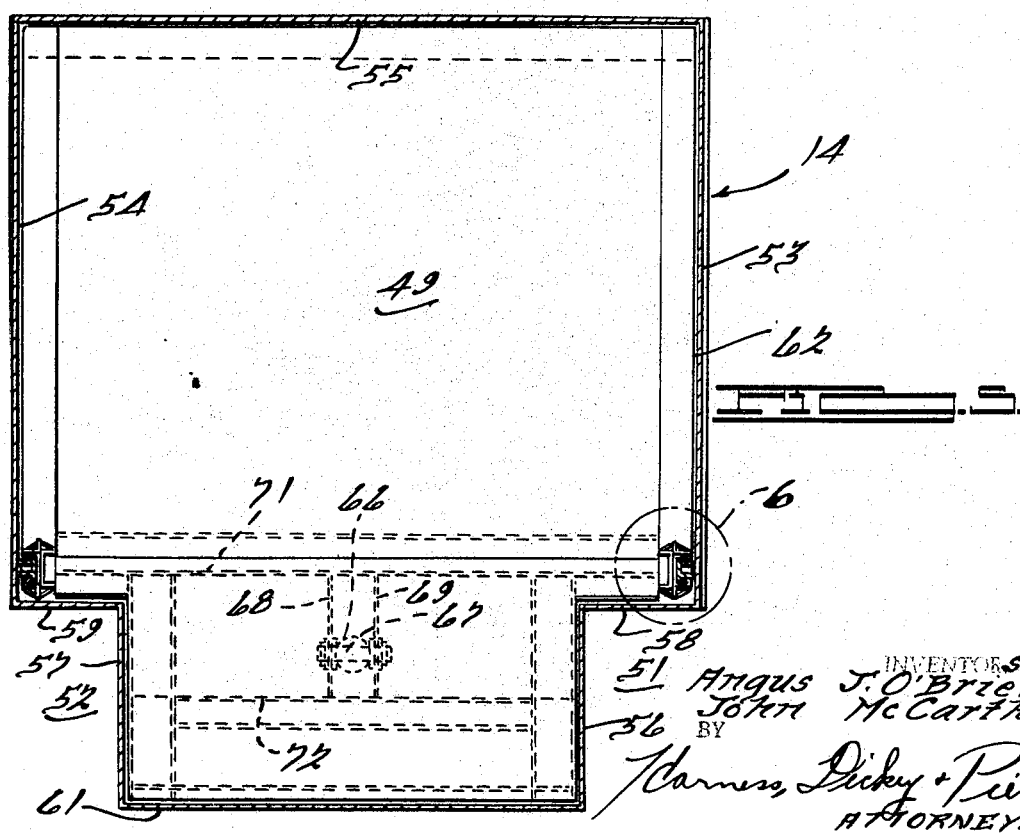

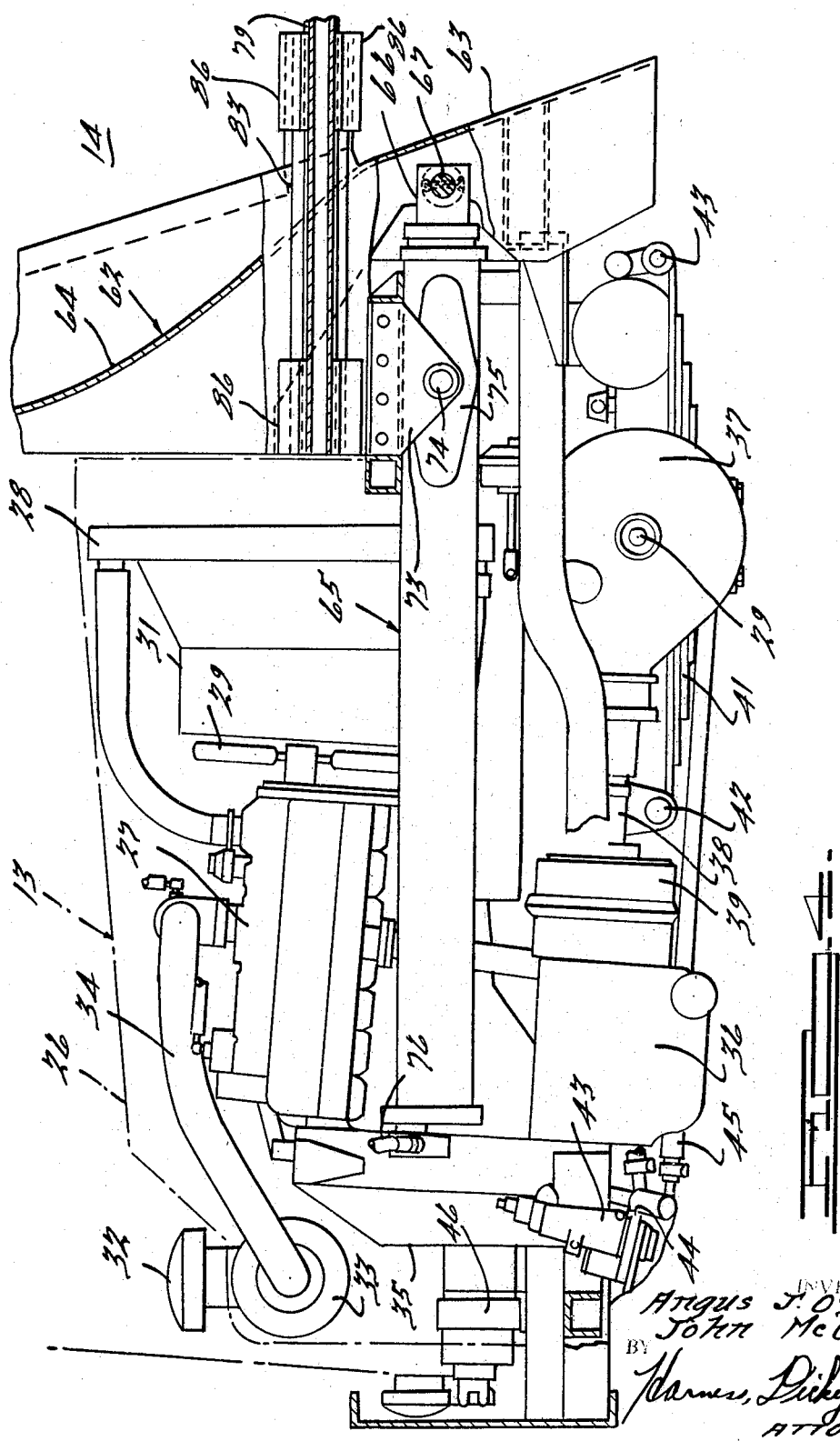

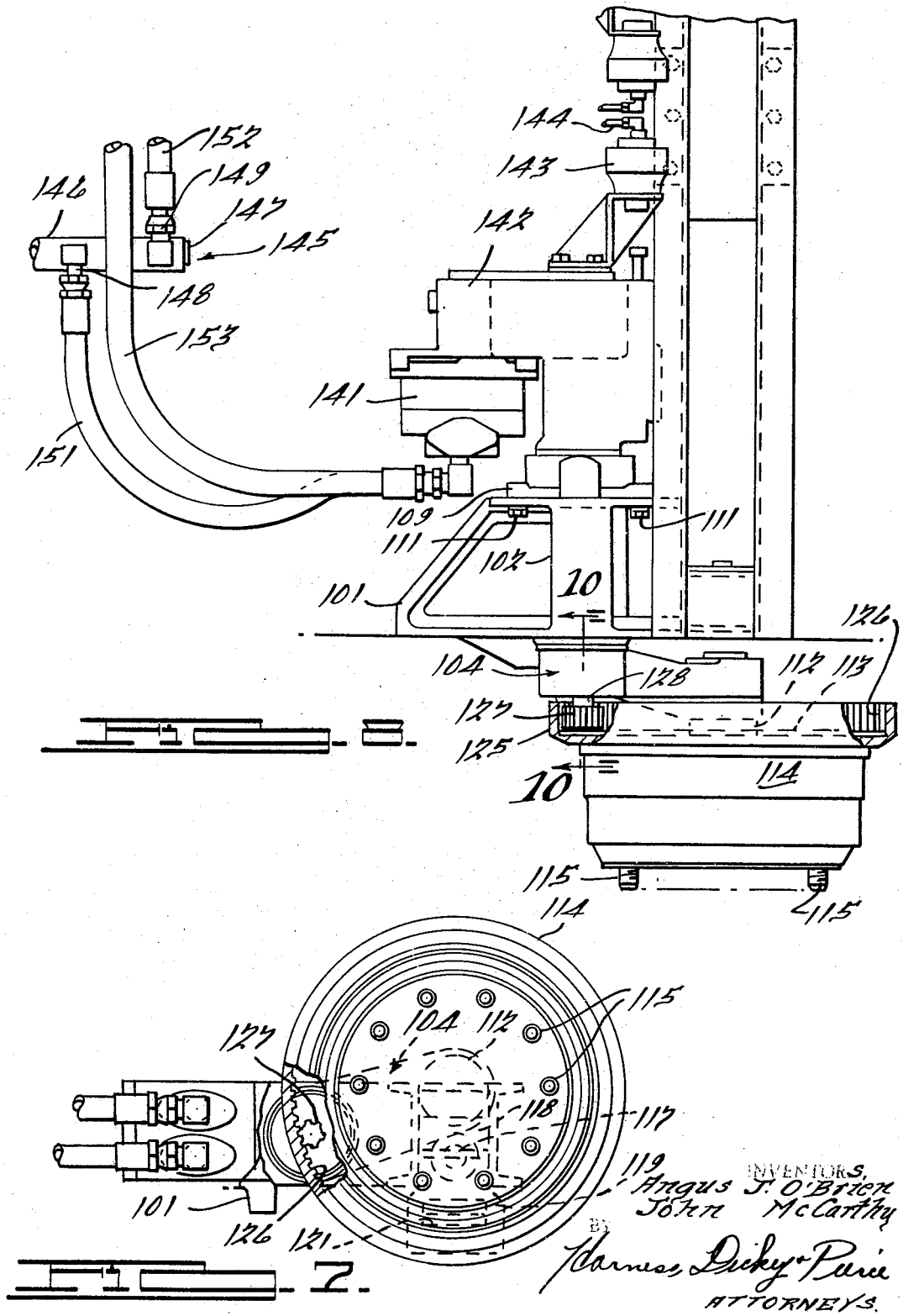

Dec. 30, 1969  A. J. O'BRIEN ET AL  3,486,646
REFUSE VEHICLE
Filed Oct. 19, 1965  5 Sheets-Sheet 5
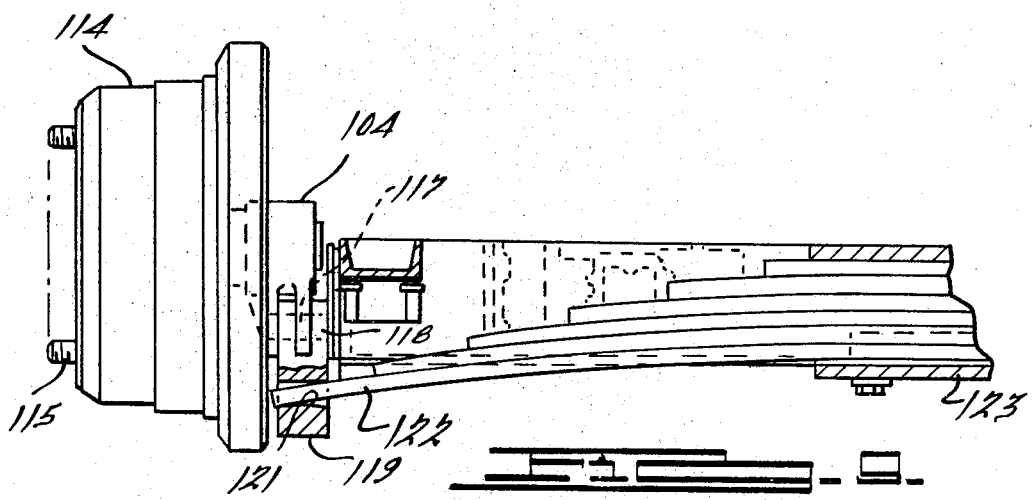
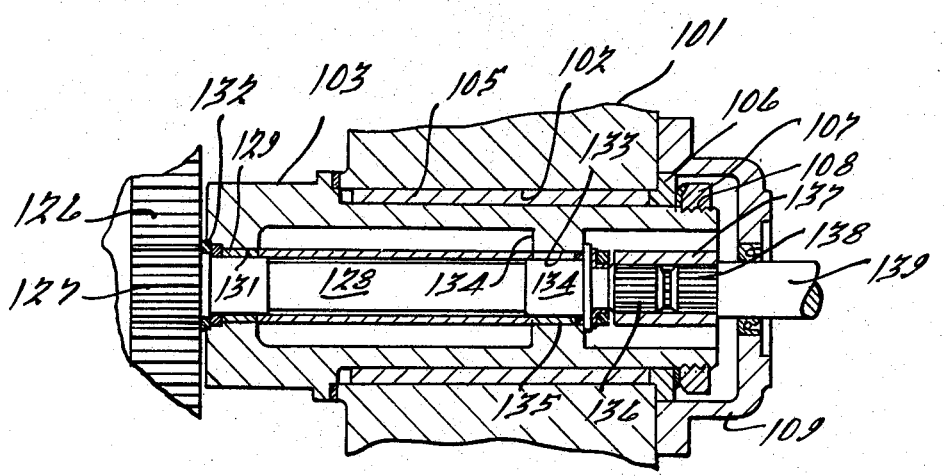
INVENTORS.
Angus J. O'Brien
John McCarthy
BY
ATTORNEYS.

United States Patent Office 3,486,646
Patented Dec. 30, 1969

1

3,486,646
REFUSE VEHICLE
Angus J. O'Brien, Bloomfield Hills, and John McCarthy, Dearborn, Mich., assignors to Gar Wood Industries, Inc., a corporation of Michigan
Filed Oct. 19, 1965, Ser. No. 497,950
Int. Cl. B65f 3/00
U.S. Cl. 214—82        33 Claims

ABSTRACT OF THE DISCLOSURE

A refuse vehicle embodying an improved driver's compartment layout, storage compartment layout, drive train, auxiliary drive, and ejection arrangement for providing a maximum storage capacity in a minimum overall dimension.

This invention relates to a refuse vehicle and more particularly to a refuse vehicle that is adapted to carry a maximum volume of refuse in a minimum overall dimension.

The use of refuse vehicles having compartments into which refuse is loaded and compacted is well known. These vehicles normally accommodate a driver and one or more helpers who assist in loading the refuse into the vehicle. When filled, the vehicle is driven to a dump area where the refuse is discharged from the storage compartment. In many large cities the dump areas are located at so great a distance from the operating area of the vehicle that it is impossible for the vehicle to make more than one round trip to the dump area in a given day. It is, therefore, essential that the vehicle hold a maximum amount of refuse. The refuse holding capacity of the vehicle is increased by means of a loading and compacting device that loads and compacts the refuse into the storage compartment of the vehicle so that a greater weight of refuse may be carried in a given volume. Although the total storage capacity of the vehicle could be increased by increasing its size, there is a practical limit to the size of such a vehicle. In addition, all states and many cities have regulations which limit the maximum size of such vehicles.

It is, therefore, the principal object of this invention to provide a novel refuse vehicle having a maximum storage volume and a minimum overall dimension.

The refuse compartment may be unloaded in one of two manners. It may be either dumped by tilting it about a horizontal axis so that the load will slide from it, or the refuse may be forced from the refuse compartment by means of an ejection member. In either type of vehicle it is necessary to form the refuse compartment with substantially the same cross-section shape along its length. With the dump type vehicle this is necessary to facilitate the dumping, and with the ejection type vehicle it is necessary to permit free movement of the ejection member.

In the conventional refuse vehicle, the refuse storage compartment is usually a separate body member mounted on the top of a conventional truck chassis having the usual frame and wheel suspension arrangement. Because of the design of such wheel suspensions it has been necessary for the refuse compartment to be located substantially above the axis of rotation of the rearwardmost wheels in order to maintain the necessary uniform cross-sectional shape.

2

It is, therefore, a further object of the invention to provide a refuse vehicle having a refuse compartment that is of unit constrruction, that is, a construction in which the storage compartment is formed without any separate reinforcing frame; and it is a related object to provide a unique wheel suspension for the unitized refuse compartment that permits the refuse compartment to extend below the axis of rotation of the supporting wheels, thereby substantially increasing the volume thereof for a given length, width and height vehicle.

A vehicle embodying this feature of the invention is comprised of a refuse compartment supported by suspension means upon at least two wheels. The suspension means comprises a trailing link supported at one end for pivotal movement about a first axis relative to the vehicle. A wheel is supported for rotation at the other end of the trailing link and resilient means resists pivotal movement of the trailing link about the first axis.

The foregoing feature permits the use of a unique shaped refuse compartment that extends below the axis of rotation of the wheels. The refuse compartment has a cross sectional configuration made of two rectangular segments. The lowermost segment is the narrowest and extends between and below the wheels while the uppermost segment overlies the wheels. The low profile of such a shape also facilitates manual loading.

Another object of this invention is to provide a novel front wheel drive system, whereby the usual drive shaft is eliminated, which otherwise would require that the refuse compartment be positioned higher, sacrificing storage capacity.

When unloading refuse from the vehicle in a dump area, the weight distribution of the vehicle, as well as the often slippery condition of such area make it frequently impossible to obtain sufficient traction with the powered front wheels to drive the vehicle into or out of the dump area. It has been found that if some auxiliary power drive means is provided for the rear wheels of the vehicle this problem is solved. Such an auxiliary drive mechanism must be compact so as to not reduce the refuse storage volume.

It is, therefore, a further object of the invention to provide a unique auxiliary drive for a refuse vehicle.

It is another object of the invention to provide such an auxiliary drive for a refuse vehicle embodying a trailing link suspension.

An auxiliary drive embodying this feature of the invention includes a trailing link suspension of the type previously described. The wheel is supported at one end of the trailing link upon a drum at one side of which internal gear means are formed. A driving pinion is enmeshed with the internal gear means and the axis of rotation of the driving pinion is aligned with the pivotal axis of the trailing link. Thus, the pinion and internal gear will remain enmeshed during jounce and rebound of the suspended wheel.

As has been noted, it is conventional in some types of refuse vehicles to provide a longitudinally movable ejection member against which the refuse is compacted and which serves the purpose of forcing the compacted refuse from the refuse compartment at the dump area. The compacting and ejecting forces create considerable bending or bulging forces upon the side walls of the storage compartment.

It is, therefore, a further object of the invention to provide an improved refuse storage construction that is relatively light without any sacrifice in its strength.

A refuse compartment for a vehicle embodying this feature of the invention is formed of sheet metal side walls. A pair of guide rails are supported at opposite sides of the compartment. An ejection member is supported within the compartment upon the guide rails for movement longitudinally of the vehicle. The support for the ejection member includes interlocking elements which coact with the guide rails to prevent bowing of the side walls in the area of the ejection member, where these stresses are the greatest, as the latter moves. The side support for the ejection member also precludes walking or tilting of the member with respect to the side walls.

The ejection member of the conventional refuse vehicle is usually operated by some form of telescopic actuator. The telescopic actuator has conventionally been positioned within a portion of the refuse compartment. Not only does this further decrease the possible volume of the compartment but it subjects the telescopic member to the corrosive action of any refuse which may escape past the ejection member. Also, in certain prior art units the placement of the telescopic member is such as to decrease the actual force in the horizontal direction, due to the angular placement employed.

It is, therefore, a further object of the invention to provide an improved telescopic member for actuating the ejection member of a refuse vehicle.

A refuse vehicle embodying this invention is comprised of an engine compartment positioned at the front of the vehicle ahead of the refuse storage compartment. An injection member is contained within the refuse storage compartment for ejecting refuse from it. Telescopic actuating means are provided to move the ejection member and which comprise two relatively movable elements. One of the elements is connected to the ejection member and the other is supported within the engine compartment so that it does not occupy any of the refuse storage volume, or suffer any of the other aforementioned disadvantages.

One facet of the instant invention which facilitates the provision of a compact vehicle is a side-by-side placement of the engine and passenger compartments. In a vehicle embodying this feature of the invention, body structure defines an engine compartment on one side of a longitudinal pane of the vehicle. A driver's compartment is formed by the body structure on the other side of the longitudinal plane and adjacent to the engine compartment. This side-by-side relationship is also particularly useful in conjunction with the forward placement of the telescopic actuating means for the ejection member, since it permits a portion of the actuating means to be positioned within the engine compartment.

The side-by-side positioning of the engine and driver's compartments can further be utilized to increase the capacity of the vehicle if the refuse compartment provided behind the engine and passenger compartments extends forwardly of the forwardmost pair of wheels of the vehicle. This construction permits the refuse compartment to occupy substantially the complete space between the wheel base of the vehicle, thus improving weight distribution and increasing refuse capacity. This forward placement of the eengine compartment, however, requires a particularly compact drive train for driving the forwardmost wheels, particularly when the side-by-side relationship of the engine and the passenger compartments are considered.

It is, therefore, another object of the invention to provide an improved driving arrangement for driving a pair of wheels from an engine that is located forwardly of the wheels.

A vehicle embodying this feature of the invention comprises an engine offset to one side of the vehicle within an engine compartment. Transfer drive means comprised of an input shaft and an output shaft disposed in a side-by-side relationship drivingly couples the output shaft of the engine with the input shaft of a change speed transmission located to the side of the engine. A short drive shaft interconnects the output shaft of the change speed transmission with a differential that transmits power to the forwardmost pair of wheels.

The forward placement of the engine and driver's compartment with respect to the driven front axle improves the overall weight distribution of the vehicle, since more weight is carried upon the front driving wheels. The side-by-side relationship of the engine and passenger compartments assists in this weight distribution without significantly increasing the overall length of the vehicle.

As has been noted, it is the common practice for a refuse vehicle to employ a team of personnel comprised of a driver and one or more helpers. On long hauls, it is convenient if the helpers can ride in the passenger compartment of the vehicle. They should be permitted free ingress and egress to the passenger compartment, however, without disturbing the driver.

It is, therefore, a still further object of this invention to provide an improved passenger compartment layout for a refuse vehicle.

A refuse vehicle embodying this feature of the invention is provided with a passenger compartment having a single door at the side thereof. When embodied in a vehicle having the side-by-side passenger and engine compartment location previously described, the single door is positioned on the side opposite to the engine compartment. A driver's seat is positioned adjacent the door but spaced inwardly therefrom. One or more passenger seats are located within the passenger compartment to the rear of the driver's seat with access space provided directly to the door.

It should be readily apparent that each of the inventive features noted above may be used singly in refuse vehicles or, in some instances, in other types of vehicles. The features, however, all coact with each other in such a manner as to provide a refuse vehicle having a maximum storage capacity within a given external dimension, without any loss in function.

Other objects and advantages of the invention will become more apparent as this description proceeds, particularly when considered in conjunction with accompanying drawings, wherein:

FIGURE 1 is a side elevational view of a refuse vehicle embodying this invention, with a portion broken away;

FIG. 2 is a front view of the vehicle shown in FIGURE 1, with a portion broken away;

FIG. 3 is an enlarged view taken in the same general direction as FIGURE 2 showing the engine compartment of the vehicle;

FIG. 4 is a cross sectional view taken generally along the line 4—4 of FIGURE 3;

FIG. 5 is an enlarged cross sectional view taken generally along the line 5—5 of FIGURE 1;

FIG. 6 is an enlarged view of the circled area in FIGURE 5;

FIG. 7 is an enlarged side elevational view showing the auxiliary rear wheel drive of the vehicle;

FIG. 8 is a top plan view, with portions broken away, of the vehicle drive shown in FIGURE 7;

FIG. 9 is an end elevational view of the drive structure shown in FIGURE 8; and

FIG. 10 is an enlarged cross sectional taken along the line 10—10 of FIGURE 8.

Referring now in detail to the drawings and in particular to FIGURES 1 through 4, a refuse vehicle embodying this invention is identified generally by the reference numeral 11. The refuse vehicle 11 is comprised of a cab which consists of a passenger compartment 12 and an engine compartment 13. Positioned adjacent the end of the cab is a refuse compartment, indicated generally by the reference numeral 14. The refuse compartment 14 has an open rear end adjacent which a loading and compacting member 15 of any known type is supported. The loading and compacting member 15 forms a closure for the rear end of the refuse compartment 14 and is pivotally supported adjacent its upper ends by a pair of pivot pins 16 that are carried by brackets 17 affixed to opposite sides of the refuse compartment 14. As is well known, the loading and compacting member 15 is adapted to load and compact refuse into the refuse compartment 14 as well as providing a closure for its open rear end. The vehicle 11 further comprises a pair of dirigible front wheels 18 and tandem rear wheel sets 19 carried at the rear of the refuse compartment 14.

It will be noted from FIGURES 1 and 4 that the passenger compartment 12 and engine compartment 13 are placed as far as possible forward with respect to the front pair of wheels 18 to maximize the volume of refuse which may be carried within the storage compartment 14 without any substantial increase in the wheel base of the vehicle. As will become more apparent as this description proceeds, the configuration of the refuse storage compartment 14 also increases its volume as do other features of the vehicle.

Positioned within the passenger compartment 12 is a single forwardly placed driver's seat 21 and a bench type seat 22 positioned to the rear of the driver's seat 21. The driver's seat 21 is displaced inwardly toward the center of the vehicle (FIG. 2) away from a door 23 that allows access to the passenger compartment 12. The inward displacement provides a floor area 24 adjacent the driver's seat 21 which permits helpers to have access to and from the bench seat 22 through the door 23 without the necessity of the driver leaving the driver's seat 21. A step 25 is provided for access to the passenger compartment 12 adjacent the door 23. The layout of the passenger compartment 12 permits helpers to ride in the seat 22 during long hauls or when traveling greater distances between areas being serviced. Free access to and from the vehicle is provided, however, without disturbance to the driver.

In addition to maximizing the volume of refuse which may be stored in the refuse compartment 14 by moving the cab forwardly, the overall vehicle length is decreased by positioning the engine compartment 13 at the side of the passenger compartment 12 as opposed to the normal placement of the engine compartment in front of the passenger compartment. The engine compartment 13 may be considered as lying on one side of a medial longitudinal plane of the vehicle 11 with the passenger compartment 12 on the opposite side of the longitudinal plane.

The engine compartment 13 and drive arrangement which permits the compact configuration may be best understood by reference to FIGURES 3 and 4. The engine compartment 13 is defined by a low profile sheet metal hood, indicated in dot dash lines at 26. Positioned below the hood 26 is an internal combustion engine 27 which is depicted as being of the liquid cooled compression ignition type. A cooling radiator 28 is positioned to the rear of the engine 27 and lies above a driving axle 29 that supports the front wheels 18. A cooling fan 29 is driven from the rear end of the engine to circulate air across the radiator 28 through a sheet metal shroud 31. The air induction system for the engine 27 includes an air cleaner and silencer 32 part of which is positioned externally of the hood 26 at the front of the vehicle. Air is delivered from the external portion of the air cleaner and silencer 32 to a portion 33 located internally of the hood and thence through an air delivery conduit 34 to the engine intake manifold.

The flywheel end of the engine 27 is located at the front of the engine compartment 13 and the engine delivers its power to a transfer drive mechanism indicated generally at 35. The transfer drive mechanism may be of any known type such as a gear or chain type having offset input and output shafts (not shown). The input shaft of the transfer drive mechanism 35 is drivingly coupled through a conventional clutch (not shown) to the engine crankshaft. The output shaft of the transfer drive mechanism 35 is connected to the input shaft of a change speed transmission 36 positioned adjacent the forward end of the engine 27 and offset from the engine 27 toward the medial longitudinal plane and passenger compartment 12. The output shaft of the change speed transmission 36 delivers power to the input pinion of a differential 37 by means of a short drive shaft 38 around which a service brake 39 is provided. The differential 37, drive shaft 38 and transmission 36 lie substantially upon the medial longitudinal plane of the vehicle 11. It also will be noted from FIGURE 2 that the width of the engine compartment 13 and driver's compartment 12 is no wider and is in fact narrower than the refuse storage compartment 14.

The differential 37 delivers power in a known manner to the front axle 29 which is suspended at each side of the vehicle 11 by means of a semi-elliptic spring 41 carried by a spring hanger 42 at its forward end and by means of a shackle 43 at its rear end. The front wheels 18, in addition to being driven, are dirigibly supported at the ends of the axle 29 in a known manner. The wheels are steered by means of a conventional steering linkage comprising a steering gear box 43, pitman arm 44 and drag links 45.

Driven off of the transfer drive mechanism 35 is a hydraulic pump 46 that provides a source of hydraulic power for various accessories of the vehicle 11, as will become more apparent as this description proceeds.

The refuse compartment 14 (FIGS. 1, 5, and 6) is of generally unitized construction. That is, it is formed from sheet metal walls and is substantially self-supporting without the necessity of resorting to any external supporting frame. The refuse compartment 14 may be connected to a stub frame (not shown) that supports the engine and passenger compartments 13 and 12 at its front in any known manner. The refuse compartment 14 extends rearwardly from the passenger compartment 12 and engine compartment 13 from a point slightly ahead of the trailing ends of the front wheels 18 to a point slightly behind the rear pair of wheels 19. The transverse cross sectional shape of the refuse storage area defined by the refuse compartment 14, indicated generally by the reference numeral 49, is comprised of two interconnected rectangular segments. The uppermost segment is wider than the lowermost segment to provide a pair of wheel arches 51 and 52 that extend the length of the refuse compartment 14.

The uppermost segment of the refuse storage area 49 is defined by a first pair of sheet metal outer side walls 53 and 54 spanned at their top by a sheet metal top wall 55. The lowermost segment of the refuse storage area 49 is formed by a pair of upstanding sheet metal side walls 56 and 57 which define the inner extremities of the wheel arches 51 and 52, respectively. The upper ends of the side walls 56 and 57 are connected to the lower ends of the sheet metal side walls 53 and 54 by horizontally extending sheet metal panels 58 and 59, respectively, which define the upper extremity of the wheel arches 51 and 52. A sheet metal floor pan 61 spans the lower ends of the upstanding walls 56 and 57.

Each of the sheet metal surfaces 53, 54, 55, 58, 59 and 61 extends without interruption from the front to the rear of the vehicle so that the cross sectional area of the storage compartment 49 is substantially constant along the length of the vehicle. The only exception to this is at the front of the vehicle wherein wheel arches 62 (FIG. 1) are provided for steering clearance at the rear edges of the wheels 18. The wheel arches are formed by upwardly depressed portions of the side walls 56 and 57. The smooth continuous walls defining a constant cross sectional area along the length of the refuse compartment 14 are necessary to permit compacting and ejection of refuse within the area 49 for a reason which will become more apparent as this description proceeds. The location of the wheel arches 62 does not adversely affect this function, as will also become apparent.

The loading and compacting member 15 fills the refuse compartment 14 as well as forming a closure for its open end. An ejection member indicated generally by the reference numeral 62 is provided to function as a reaction member during the compaction of the refuse and to force the refuse from the refuse compartment 14 at a dump or unloading area. The ejection member 62 (FIG. 4) has an inclined substantially planar lower surface 63 and a substantially vertically extending planar surface which would appear at the upper end of FIGURE 4. These surfaces are joined by means of an arcuate surface 64. The ramp shape of the portion 63 assists in the unloading of the refuse from the storage area 49 since it provides a scoop or shovel effect and additionally provides the required clearance for the wheel arches 62 since it extends rearwardly of them in its forwardmost position. The shape of the ejection member 62 in a transverse plane (FIGURE 5) is complementary to the shape of the refuse storage area 49 so that refuse cannot escape to the rear of the member 62.

A hydraulic ejection cylinder, indicated generally by the reference numeral 65 (FIGS. 3 and 4) is positioned within the engine compartment 13 upon the medial longitudinal plane of the vehicle. A telescopic piston rod 66 is supported with the cylinder 65. One end of the piston rod 66 is pivotally connected to the ejection member 62 to provide a reaction force for it and to urge the member 62 longitudinally of the vehicle 11 and eject the refuse from the refuse compartment 14. To maintain a minimum length the piston member 66 is telescopic in three stages.

The outer end of the piston rod 66 is pivotally connected to a pivot shaft 67 carried by a pair of vertically extending plates 68 and 69 (FIG. 5) that are welded to the forward surface of the ejection member 62. The upper end of the plates 68 and 69 are welded to a horizontally extending plate 71 and their lower ends are welded to a horizontally extending plate 72, which plates serve the additional function of reinforcing the ejection member 62.

The cylinder 65 is pivotally supported at each side by means of a pair of brackets 73 (FIGURE 4) that are affixed to a rigid cross member of the cab portion of the vehicle 11. The brackets 73 carry trunnions 74 that engage sockets formed in plates 75 at each side of the cylinder 65. The pivotal support of the cylinder 65 and the pivotal connection between the piston rod 66 and the ejection member 62 permits movement of the panel 62 in a vertical direction as it traverses the length of the refuse compartment 14 without placing undue stress on the piston rod 66. The ejection cylinder 65 is supplied with hydraulic fluid from the accessory pump 46 through any suitable control system (not shown) and a conduit 76. It will be noted that the cylinder 65 is located on the medial longitudinal plane of the vehicle and of the refuse storage area 49 and extends forwardly into the engine compartment 13 adjacent the passenger compartment 12. The cylinder 65 also lies slightly above the transmission 36, drive shaft 38 and differential 37.

In a transverse plane, the ejection member 62 has substantially the same shape as the storage area 49 but is slightly smaller than it to provide some clearance. The compacting forces upon the ejection member 62 and the ejection forces upon it tend to cause the sheet metal side walls 53 and 54 to bow outwardly from the ejection member 62 with the possibility that refuse may escape behind the member 62. To preclude against this bowing action and to guide the ejection member 62 along the length of the refuse compartment 14, a support mechanism shown in FIGURES 4 through 6 is provided.

The support mechanism is comprised of a generally box shaped guide rail 79 that is affixed, as by welding, to the side walls of the refuse compartment 14 and particularly to the walls 53 and 54. Each guide rail 79 has an upwardly extending flange 81 and a downwardly extending flange 82. At the respective sides of the ejection member 62, an elongated channel shaped support member 83 (FIG. 4) is provided. The channel shaped member 83 has its legs 84 and 85 extending toward and affixed to the ejection member 62 at each side thereof and adjacent to the guide rails 79. At each end of each channel shaped member 83 a guide structure is formed. Each guide structure includes a Z-shaped member 86 having its long leg extending in a substantially horizontal direction and one short leg 87 depending below the upstanding flange 81 but spaced slightly outwardly and above it. The Z-shaped member 86 is welded to the respective end of the channel 83. A similar Z-shaped member 88 is welded to the lower end of the channel 83 and has an upstanding leg 89 extending toward the flange 82 but spaced slightly below and outwardly of it. Interposed between each of the Z-shaped members 86 and 88 and the guide rail 79 are a pair of antifriction guides 91 and 92. The guides 91 and 92 may be held in place in any suitable manner, as by the screws 93. It is to be understood that one pair of the antifriction members 91 and 92 is provided at each end of each side of the ejection member 62. The guide members 91 and 92 engage the lower and upper surfaces of the structural member 79 and the inner surfaces of the flanges 82 and 81, respectively.

The positioning of longitudinally spaced supports at each side of the ejection panel 62 insures against tilting of the ejection member 62 under the compacting and ejection forces. In addition, the coaction between the antifriction members 91 and 92 and the flanges 81 and 82 of the guide rails 79 resist any tendency for any side walls 53, 54, 56 and 57 to bow adjacent the ejection member 62 under either compaction or ejection forces.

As has been noted, the lower surface of the refuse storage compartment 14, as defined by the bottom wall 61, extends below the tops of the rear wheels 19 and, in fact, extends below their normal axes of rotation. It is, however, desirable in some instances to drive the rear wheels 19 and they must additionally be suspended to absorb road shocks. The driving requirement is a result of the fact that the vehicle 11 is normally unloaded by backing it into a dump area. Refuse is ejected from the rear of the storage compartment 14 by extension of the ejection member 62 when the loading and compacting member 15 is swung upwardly away from its closure forming position at the rear of the refuse compartment 14. After unloading the weight transfer of the vehicle may be sufficient so that the driving of the front wheels 18 does not provide sufficient tractive power to move the vehicle 11 from its unloading position. Therefore, some auxiliary drive for the rear wheels 19 or at least one pair of them is provided as a part of this invention. The previous proposed suspension systems for the rear wheels of refuse vehicles have not permitted the low center of gravity and maximum storage area envisioned by the present invention. To permit the low center of gravity and a refuse storage area which extends below the axis of rotation of the rear wheels, the novel suspension and drive structure shown in FIGURES 7 through 10 is employed. The drive and suspension structure for a single of the wheels 19 is shown. It is to be understood, however, that such a structure may be provided for each wheel or, alternatively, only one pair of the rear wheels may be driven. Also in some vehicles, only one set of rear wheels is required.

Referring now specifically to FIGURES 7 through 10, a support bracket 101 is affixed in any suitable manner, as by welding, to the underside of the sheet metal member 61. The bracket 101 has a cylindrical journal portion 102 that supports a shaft 103 integrally formed at one end of a trailing arm, indicated generally by the reference numeral 104. An antifriction bearing 105 is interposed between the shaft 103 and journal portion 102. The bearing 105 is held axially in place by a packing ring 106 and nut 107, that is threaded onto threaded inner end 108 of the shaft 103. A bearing cap or seal 109 is positioned around the inner end of the shaft 103 and is held in place by bolts 111.

The rear end of the trailing arm 104 carries an outwardly extending spindle 112 upon which the backing plate 113 of a drum 114 is journaled. The drum 114 has a plurality of circumferentially spaced studs 115 so that the wheel 19 may be affixed to it.

It will be noted that the trailing arm 104 extends upwardly and rearwardly (FIG. 7) so that the pivot axis of the shaft 103 and the journal 102 lies below the pivotal axis defined by the spindle 112. In addition, the center of rotation of the spindle 112 lies slightly above the sheet metal floor 61 even when the vehicle is in its unloaded position.

A pivot pin 117 is carried at the lower end of a bracket 118 that is affixed to or is integral with the lower end of the rear end of the trailing arm 104. A shackle-like member 119 is pivoted upon the pivot pin 117 below the bracket 118. The shackle like member 119 has a rectangular aperture 121 into which the lower leaf of a transverse leaf spring 122 (FIG. 9) extends. The center of the leaf spring 122 is affixed to the underside of the vehicle by means of a mounting plate 123. Thus, each end of the leaf spring 122 serves to resiliently suspend the wheel 19 at the respective side of the vehicle. Upon jounce and rebound shocks transmitted to the wheels 19, the trailing arm 104 will pivot with the shaft 103 rotating in the journal 102. This pivotal movement is transmitted through the shackle 119 to the leaf spring ends 122 to absorb the road load shocks.

It should be readily apparent that other springs than the leaf spring 122 could be used with the disclosed trailing arm suspension. For example, a torsion bar could be positioned coaxially with the trailing link shaft 103 in lieu of the leaf spring 122 or in addition to it.

The drum 114 has a radially inwardly extending flange portion 125 on the inner surface of which an internal gear 126 is formed. The internal gear 126 is formed coaxially with the axis of rotation defined by the spindle 112. Enmeshed with the internal gear 126 is a drive pinion 127 that is supported at the outer end of a drive shaft 128 which extends coaxially through the hollow interior of the trailing link shaft 103 (FIG. 10). The drive shaft 128 is coaxial with the journal 102 for a reason which will become more apparent as this description proceeds. The outer end of the drive shaft 128 is journaled in an antifriction bearing 129 supported in a bore 131 at the outer end of the shaft 103. A seal 132 is provided at the outer end of the bore 129. A similar bore 133 formed by a radially inwardly extending collar portion 134 of the shaft 103 supports an enlarged portion 134 of the shaft 128 by means of an antifriction bearing 135. The inner end of the drive shaft 128 is splined, as at 136 and a splined coupling 137 connects it with a splined end 138 of a driving shaft 139.

A reversible hydraulic motor 141 is provided for each of the wheels 19 (FIG. 8). The output shaft of the hydraulic motor 141 is connected to a transfer gear case 142 in which a gear unit and clutch are provided. The clutch (not shown) is actuated by means of a pneumatic cylinder 143 in a known manner so that the output shaft of the hydraulic motor 141 may be coupled or uncoupled from the driving shaft 139 and, accordingly, to and from the drive shaft 128. The pneumatic clutch actuating device 143 is provided with a pressure conduit 144 that may be selectively energized for actuating the pneumatic clutch and engaging or disengaging the fluid motor 141 from the driving shaft 139. The clutch is deenergized during the times which the wheels 19 are not being driven so that the hydraulic motor 141 will not cause a drag upon the driving wheels 18.

The fluid motor 141 receives fluid under pressure from the auxiliary pump 46 through any suitable hydraulic control circuit which may be located in the driver's cab 12 and by means of a manifold, indicated generally by the reference numeral 145. The manifold 145 comprises a tubular metallic body 146 which may be round or square in cross-section and extends along the under body of the refuse compartment 14 from the driver's cab 12. The outer end of the tubular member 146 is closed by a plug 147. Tapped into the tubular member 146 are fittings 148 and 149 that are coupled to flexible conduits 151 and 152, respectively. A similar manifold arrangement in the form of a tubular element, fittings, and flexible conduit (not shown) is also provided for each of the hydraulic motors 141. A fluid conduit 153 extends from this additional manifold to the motor 141. The conduits 153 and 151 are connected to the fluid motor 141 to energize it by means of suitable fittings.

It should be noted that the hydraulic drive for the rear wheels 19 is so positioned that the wheels 19 may be driven and yet their centers lie above the lower surface of the refuse storage compartment 14. The offset drive arrangement does not interfere with the suspension system since the center of rotation of the driving pinion 127 is coaxial with the center of rotation of the trailing link 104 under jounce and rebound forces. Thus, engagement between the pinion 127 and internal gear 126 is insured at all times regardless of the axial position of the trailing link 104.

It should be readily apparent that the disclosed vehicle embodies many advantageous features which, although capable of separate use, combine to form a refuse vehicle that has maximum utility, and maximum storage volume within a minimum overall space. The arrangement of the driver's cab at one side of the vehicle with the driver's seat inwardly of and forward of the occupant's seat permits helpers to travel in the vehicle during longer hauls and yet allows free ingress and egress without disturbing the driver. The side-by-side relaitonship of the driver's compartment and engine permits a reduction in the overall length of the vehicle. The particular drive arrangement disclosed permits a forward placement of the engine with respect to the driven front wheels thus allowing the refuse storage compartment to occupy at least part of the space between and above the front wheels. The unique suspension and drive arrangement for the rear wheels both permits the rear wheels to be driven and yet allows the storage compartment to occupy the space below the centers of the rear wheels. All of these facets in combination with the unitized construction of the refuse storage compartment and is coaction with the ejection member to prevent bulging of the side walls permits a maximum volume of refuse to be stored in a minimum overall dimension. The advantage of this should be readily apparent.

In one preferred embodiment of the invention a total refuse storage capacity of 40 cubic yards was possible with a vehicle having an overall length of 32 feet, an overall width of 96 inches, a wheel base of 18 feet, and an overall height of 10½ feet. A conventional vehicle of these dimensions would normally have no more than 20 cubic yards of capacity. The space between the rear wheels accommodates about 14 cubic yards in this specific embodiment since the lowermost rectangular segment comprises about 35% of the total volume of the refuse compartment 14. This capacity is roughly equivalent to the provision of an additional 7 feet in vehicle length when considered in comparison with a conventional type vehicle.

While it will be apparent that the preferred embodiments of this invention are well calculated to fulfill the objects above stated, it will be appreciated that the invention is susceptible to variation, modification and change.

What is claimed is:

1. A refuse vehicle defining a longitudinally extending refuse compartment, a combined reaction and ejection member positioned within said compartment, said compartment being provided with longitudinally extending guide rails at opposite sides thereof, said guide rails being comprised of closed hollow cross-sectional members extending longitudinally of said refuse compartment and flanges extending outwardly therefrom into said refuse compartment, said flanges extending longitudinally of said refuse compartment, supporting means at each side of said ejection member engaging said guide rails for guiding said ejection member longitudinally of said storage compartment, and interengaging means on said support means engaging said guide rail flanges for precluding relative movement between said guide rails and said support means in a direction transversely of said storage compartment for precluding bowing of the side walls thereof under compressive forces.

2. A refuse vehicle having a substantially frameless refuse compartment defined by sheet side, top and bottom walls, a combined reaction and ejection member positioned within said compartment, said compartment being provided with longitudinally extending guide rails at opposite sides thereof, said guide rails being comprised of closed hollow cross-sectional members extending longitudinally of said refuse compartment and flanges extending outwardly therefrom into said refuse compartment, said flanges extending longitudinally of said refuse compartment, supporting means at each side of said ejection member engaging said guide rails for guiding said ejection member longitudinally of said storage compartment, and interengaging means on said support means engaging said guide rail flanges for precluding relative movement between said guide rails and said support means in a direction transversely of said storage compartment for precluding bowing of the side walls thereof under compressive forces.

3. A refuse vehicle comprised of at least two ground engaging wheels, a refuse compartment, suspension means for suspending said refuse compartment upon said wheels, said refuse compartment defining a refuse storage volume having a transverse cross-sectional configuration made up of two interconnected rectangular segments, said rectangular segments being vertically disposed with respect to each other, the lowermost of said segments being narrower than the uppermost of said segments, said lowermost segment being disposed at least in part between said two wheels and the uppermost of said segments overlying at least in part said two wheels, a combined reaction and ejection member positioned within said compartment, said ejection member having a complementary shape to said compartment, said compartment being provided with longitudinally extending guide rails at opposite sides thereof, said guide rails being comprised of closed hollow cross-sectional members extending longitudinally of said refuse compartment and flanges extending outwardly therefrom into said refuse compartment, said flanges extending longitudinally of said refuse compartment, supporting means at each said of said ejection member engaging said guide rails for guiding said ejection member longitudinally of said storage compartment, and interengaging means on said support means engaging said guide rail flanges for precluding relative movement between said guide rails and said support means in a direction transversely or said storage compartment for precluding bowing of the side walls thereof in response to compressive forces.

4. A refuse vehicle as set forth in claim 3 wherein the lowermost segment comprises at least 25% of the total storage volume of the refuse compartment.

5. A refuse vehicle comprised of at least two ground engaging wheels, a substantially frameless refuse compartment defined by sheet metal walls defining a refuse storage volume having a transverse cross-sectional configuration made up of two interconnected rectangular segments, said segments being vertically disposed with respect to each other, the lowermost of said segments being narrower than the uppermost of said segments, said lowermost segment being disposed at least in part between said walls, the uppermost of said segments overlying at least in part said walls, a combined reaction and ejection member positioned within said compartment, said ejection member having a shape complementary to the shape of said compartment, said compartment being provided with longitudinally extending guide rails at opposite sides thereof, said guide rails being comprised of closed hollow cross-sectional members extending longitudinally of said refuse compartment and flanges extending outwardly therefrom into said refuse compartment, aid flanges extending longitudinally of said refuse compartment, supporting means at each side of said ejection member engaging said guide rails for guiding said ejection member longitudinally of said storage compartment, and interengaging means on said support means engaging said guide rail flanges for precluding relative movement between said guide rails and said support means in a direction transversely of said refuse compartment for precluding bowing of the side walls thereof under compressive forces.

6. A refuse vehicle as set forth in claim 5 wherein the lowermost segment comprises at least 25% of the total storage volume of the refuse compartment.

7. A refuse vehicle comprised of at least two ground engaging wheels, a substantially frameless refuse compartment defined by sheet metal walls defining a refuse storage volume having a transverse cross-sectional configuration made up of two interconnected rectangular segments, said segments being vertically disposed with respect to each other, the lowermost of said segments being narrower than the uppermost of said segments, said lowermost segment being disposed at least in part between said wheels, the uppermost of said segments overlying at least in part said wheels, a combined reaction and ejection member positioned within said compartment, said ejection member having a shape complementary to the shape of said compartment, said compartment being provided with longitudinally extending guide rails at opposite sides thereof, supporting means at each side of said ejection member engaging said guide rails for guiding said ejection member longitudinally of said storage compartment, preventing bowing of said side walls and precluding tilting of said ejection member, said supporting means comprising a supporting member extending substantially parallel to the respective guide rail and bearing members at opposite ends of said supporting member for engaging said guide rail, said bearing members and said guide rails having interengaging surfaces for precluding relative movement therebetween in a direction transversely to the longitudinal axes of said refuse compartment, means supporting said refuse compartment upon each of said wheels comprising a trailing link, means supporting one end of said trailing link for pivotal movement about a first axis relative to said vehicle, means for supporting a wheel drum at the other end of said trailing link for rotation about a second axis and resilient means for cushioning pivotal movement of said trailing link about said first axis, and auxiliary drive means for each of said drums comprising flange means formed at one side thereof, internal gear means formed in said flange means, a driving pinion enmeshed with said internal gear means, the axis of rotation of said driving pinion being coaxial with said first axis for continuous engagement of said driving pinion with said internal gear upon jounce and rebound of the suspended wheel, and means for driving said driving pinion.

8. A refuse vehicle as set forth in claim 7 further including an internal combustion engine, at least one additional ground engaging wheel, means for driving said additional wheel from said internal combustion engine and the means for driving the driving pinions comprises an auxiliary motor driven by the engine.

9. A refuse vehicle as set forth in claim 8 wherein the auxiliary motor is a fluid motor driven by means of a fluid pump.

10. A refuse vehicle comprised of an engine compartment at the forward end of said vehicle, at least two ground engaging wheels, a substantially frameless refuse compartment defined by sheet metal walls defining a refuse storage volume having a transverse cross-sectional configuration made up of two interconnected rectangular segments, said segments being vertically disposed with respect to each other, the lowermost of said segments being narrower than the uppermost of said segments, said lowermost segment being disposed at least in part between said wheels, the uppermost of said segments overlying at least in part said wheels, a combined reaction and ejection member positioned within said compartment, said ejection member having a shape complementary to the shape of said compartment, said compartment being provided with longitudinally extending guide rails at opposite sides thereof, supporting means at each side of said ejection member engaging said guide rails for guiding said ejection member longitudinally of said storage compartment, preventing bowing of said side walls and precluding tilting of said ejection member, said supporting means comprising a supporting member extending substantially parallel to the respective guide rail and bearing members at opposite ends of said supporting member for engaging said guide rail, said bearing members and said guide rails having interengaging surfaces for precluding relative movement therebetween in a direction transversely to the longitudinal axes of said refuse compartment, a hydraulic cylinder element and a relatively movable piston element for moving said ejection member longitudinally of said refuse compartment, said hydraulic cylinder element being pivotally supported intermediate its ends within said engine compartment, one end of said hydraulic piston element being pivotally connected to the ejection member.

11. A compact self-propelled refuse vehicle comprising body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, a refuse compartment at the rear of said engine compartment and terminating at one end thereof adjacent said engine compartment, an ejection member supported for movement longitudinally of said refuse compartment, telescopic actuating means comprised of two relatively movable elements for moving said ejection member longitudinally of said refuse storage compartment, at least one of said elements being contained within said engine compartment, and means operatively connecting the other of said elements with said ejection member.

12. A compact self-propelled refuse vehicle comprising body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, a refuse compartment at the rear of said engine compartment and terminating at one end thereof adjacent said engine compartment, an ejection member supported for movement longitudinally of said refuse compartment, said compartment being provided with longitudinally extending guide rails at opposite sides thereof, supporting means at each side of said ejection member engaging said guide rails for guiding said ejection member longitudinally of said storage compartment, interengaging means on said supporting means and said guide rails for precluding relative movement between said guide rails and said support means in a direction transversely of said storage compartment for precluding bowing of the side walls thereof in response to compressive forces, telescopic actuating means comprised of two relatively movable elements for moving said ejection member longitudinally of said refuse storage compartment, at least one of said elements being contained within said engine compartment, and means operatively connecting the other of said elements with said ejection member.

13. A compact self-propelled refuse vehicle comprising body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, a refuse compartment at the rear of said engine compartment and terminating at one end thereof adjacent said engine compartment, an ejection member supported for movement longitudinally of said refuse compartment, said compartment being provided with longitudinally extending guide rails at opposite sides thereof, supporting means at each side of said ejection member engaging said guide rails for guiding said ejection member longitudinally of said storage compartment, each of said supporting means comprising a supporting member extending substantially parallel to the respective guide rail and bearing members at opposite ends of said supporting member for engaging said guide rails and preventing tilting of said ejection member with respect to said guide rails, telescopic actuating means comprised of two relatively movable elements for moving said ejection member longitudinally of said refuse storage compartment, at least one of said elements being contained within said engine compartment, and means operatively connecting the other of said elements with said ejection member.

14. A compact self-propelled refuse vehicle comprising body structure defining an eninge compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, a substantially frameless refuse compartment at the rear of said engine compartment defined by sheet side, top and bottom walls, a combined reaction and ejection member positioned within said compartment, said compartment being provided with longitudinally extending guide rails at opposite sides thereof, supporting means at each side of said ejection member engaging said guide rails for guiding said ejection member longitudinally of said storage compartment, interengaging means on said support means and said guide rails for precluding relative movement between said guide rails and said support means in a direction transversely of said storage compartment for precluding bowing of the side walls thereof under compressive forces, telescopic actuating means comprised of two relatively movable elements for moving said ejection member longitudinally of said refuse storage compartment, at least one of said elements being contained within said engine compartment, and means operatively connecting the other of said elements with said ejection member.

15. A compact self-propelled refuse vehicle comprising body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, at least two ground engaging wheels, a substantially frameless refuse compartment defined by sheet metal walls defining a refuse storage volume having a transverse cross-sectional configuration made up of two interconnected rectangular segments, said segments being vertically disposed with respect to each other, the lowermost of said segments being narrower than the uppermost of said segments, said lowermost segment being disposed at least in part between said wheels, the uppermost of said segments overlying at least in part said wheels, a combined reaction and ejection member positioned within said compartment, said ejection member having a shape complementary to the shape of said compartment, said compartment being provided with longitudinally extending guide rails at opposite sides thereof, supporting means at each side of said ejection member engaging said guide rails for guiding said ejection member longitudinally of said storage compartment, preventing bowing of said side walls and precluding tilting of said ejection member, said supporting means comprising a supporting member extending substantially parallel to the respective guide rail and bearing members at opposite ends of said supporting member for engaging said guide rail, said bearing members and said guide rails having interengaging surfaces for precluding relative movement therebetween in a direction transversely to the longitudinal axes of said refuse compartment, telescopic actuating means comprised of two relatively movable elements for moving said ejection member longitudinally of said refuse storage compartment, at least one of said elements being contained within said engine compartment, and means operatively connecting the other of said elements with said ejection member.

16. A refuse vehicle as set forth in claim 15 wherein the telescopic actuating means is comprised of a hydraulic cylinder element and a hydraulic piston element, said elements being disposed substantially along the longitudinal plane of said vehicle with the hydraulic cylinder element positioned within the engine compartment and the hydraulic piston element operatively connected to the ejection member.

17. A refuse vehicle as set forth in claim 16 wherein the hydraulic cylinder element is pivotally supported within the engine compartment and one end of the hydraulic piston element is pivotally connected to the ejection member.

18. A refuse vehicle as set forth in claim 17 wherein the lowermost segment of the refuse storage volume comprises at least 25% of its total volume.

19. A refuse vehicle as set forth in claim 18 wherein the driver's compartment has a single door formed at the side opposite to the engine compartment, a driver's seat is located within the driver's compartment adjacent said door and spaced therefrom toward said engine compartment and a bench type passenger seat is positioned within the driver's compartment to the rear of said driver's seat.

20. A compact self-propelled refuse vehicle comprising at least four ground engaging wheels, body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, a refuse compartment at the rear of said engine compartment and terminating at one end thereof adjacent said engine compartment, an ejection member supported for movement longitudinally of said refuse compartment, telescopic actuating means comprised of two relatively movable elements for moving said ejection member longitudinally of said refuse storage compartment, at least one of said elements being contained within said engine compartment, and means operatively connecting the other of said elements with said ejection member.

21. A refuse vehicle as set forth in claim 20 wherein the telescopic actuating means is hydraulically actuated and is operated by a hydraulic accessory pump driven by the engine.

22. A compact self-propelled refuse vehicle comprising at least four ground engaging wheels, body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, a refuse compartment at the rear of said engine compartment and terminating at one end thereof adjacent said engine compartment, an ejection member supported for movement longitudinally of said refuse compartment, said compartment being provided with longitudinally extending guide rails at opposite sides thereof, supporting means at each side of said ejection member engaging said guide rails for guiding said ejection member longitudinally of said storage compartment, interengaging means on said supporting means and said guide rails for precluding relative movement between said guide rails and said support means in a direction transversely of said storage compartment for precluding bowing of the side walls thereof in response to compressive forces, telescopic actuating means comprised of two relatively movable elements for moving said ejection member longitudinally of said refuse storage compartment, at least one of said elements being contained within said engine compartment, and means operatively connecting the other of said elements with said ejection member.

23. A compact self-propelled refuse vehicle comprising at least four ground engaging wheels, body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, a refuse compartment at the rear of said engine compartment and terminating at one end thereof adjacent said engine compartment, an ejection member supported for movement longitudinally of said refuse compartment, said compartment being provided with longitudinally extending guide rails at opposite sides thereof, supporting means at each side of said ejection member engaging said guide rails for guiding said ejection member longitudinally of said storage compartment, each of said supporting means comprising a supporting member extending substantially parallel to the respective guide rail and bearing members at opposite ends of said supporting member for engaging said guide rails and preventing tilting of said ejection member with respect to said guide rails, telescopic actuating means comprised of two relatively movable elements for moving said ejection member longitudinally of said refuse storage compartment, at least one of said elements being contained within said engine compartment, and means operatively connecting the other of said elements with said ejection member.

24. A compact self-propelled refuse vehicle comprising at least four ground engaging wheels, body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, a substantially frameless refuse compartment at the rear of said engine compartment defined by sheet side, top and bottom walls, a combined reaction and ejection member positioned within said compartment, said compartment being provided with longitudinally extending guide rails at opposite sides thereof, supporting means at each side of said ejection member engaging said guide rails for guiding said ejection member longitudinally of said storage compartment, interengaging means on said support means and said guide rails for precluding relative movement between said guide rails and said support means in a direction transversely of said storage compartment for precluding bowing of the side walls thereof under compressive forces, telescopic actuating means comprised of two relatively movable elements for moving said ejection member longitudinally of said refuse storage compartment, at least one of said elements being contained within said engine compartment, and means operatively connecting the other of said elements with said ejection member.

25. A campact self-propelled refuse vehicle comprising at least four ground engaging wheels, body structure defining an engine compartment and a driver's compartment at the forward end of said vehicle, said engine compartment lying on one side of a longitudinal plane of said vehicle, said driver's compartment lying on the opposite side of said longitudinal plane and being positioned adjacent said engine compartment, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, at least two ground engaging wheels, a substantially frameless refuse compartment defined by sheet metal walls defining a refuse storage volume having a transverse cross-sectional configuration made up of two interconnected rectangular segments, said segments being vertically disposed with respect to each other, the lowermost of said segments being narrower than the uppermost of said segments, said lowermost segment being disposed at least in part between said wheels, the uppermost of said segments overlying at least in part said wheels, a combined reaction and ejection member positioned within said compartment, said ejection member having a shape complementary to the shape of said compartment, said compartment being provided with longitudinally extending guide rails at opposite sides thereof, supporting means at each side of said ejection member engaging said guide rails for guiding said ejection member longitudinally of said storage compartment, preventing bowing of said side walls and precluding tilting of said ejection member, said supporting means comprising a supporting member extending substantially parallel to the respective guide rail and bearing members at opposite ends of said supporting member for engaging said guide rail, said bearing members and said guide rails having interengaging surfaces for precluding relative movement therebetween in a direction transversely to the longitudinal axes of said refuse compartment, telescopic actuating means comprised of two relatively movable elements for moving said ejection member longitudinally of said refuse storage compartment, at least one of said elements being contained within said engine compartment, and means operatively connecting the other of said elements with said ejection member.

26. A refuse vehicle as set forth in claim 25 wherein the actuating means is comprised of a hydraulic cylinder element and a hydraulic piston element, said hydraulic cylinder element being contained within the engine compartment and said hydraulic piston element being operatively connected to the ejection member.

27. A refuse vehicle as set forth in claim 26 wherein the hydraulic cylinder element is pivotally supported within the engine compartment and one end of the hydraulic piston element is pivotally connected to the ejection member.

28. A refuse vehicle as set forth in claim 27 further including a hydraulic pump driven by the engine for operating the hydraulic cylinder and piston elements.

29. A compact self-propelled refuse vehicle comprising at least four ground engaging wheels, body structure defining an engine compartment and a passenger compartment at the forward end of said vehicle, said engine compartment lying on one side of a longitudinal plane of said vehicle, said passenger compartment lying on the opposite side of said longitudinal plane and being positioned adjacent said engine compartment, a single door in said passenger compartment at the side opposite said engine compartment, a driver's seat located within said passenger compartment adjacent said door and spaced therefrom toward said engine compartment, a bench type passenger seat positioned within said passenger compartment to the rear of said driver's seat, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, at least two ground engaging wheels, a substantially frameless refuse compartment defined by sheet metal walls defining a refuse storage volume having a transverse cross-sectional configuration made up of two interconnected rectangular segments, said segments being vertically disposed with respect to each other, the lowermost of said segments being narrower than the uppermost of said segments, said lowermost segment being disposed at least in part between said wheels, the uppermost of said segments overlying at least in part said wheels, a combined reaction and ejection member positioned within said compartment, said ejection member having a shape complementary to the shape of said compartment, said compartment being provided with longitudinally extending guide rails at opposite sides thereof, supporting means at each side of said ejection member engaging said guide rails for guiding said ejection member longitudinally of said storage compartment, preventing bowing of said side walls and precluding tilting of said ejection member, said supporting means comprising a supporting member extending substantially parallel to the respective guide rail and bearing members at opposite ends of said supporting member for engaging said guide rail, said bearing members and said guide rails having interengaging surfaces for precluding relative moevment therebetween in a direction transversely to the longitudinal axes of said refuse compartment, telescopic actuating means comprised of two relatively movable elements for moving said ejection member longitudinally of said refuse storage compartment, at least one of said elements being contained within said engine compartment, and means operatively connecting the other of said elements with said ejection member.

30. A compact self-propelled refuse vehicle comprising at least four ground engaging wheels, body structure defining an engine compartment and a passenger compartment at the forward end of said vehicle, said engine compartment lying on one side of a longitudinal plane of said vehicle, said passenger compartment lying on the opposite side of said longitudinal plane and being positioned adjacent said engine compartment, a single door in said passenger compartment at the side opposite said engine compartment, a driver's seat located within said passenger compartment adjacent said door and spaced therefrom toward said engine compartment, a bench type passenger seat positioned within said passenger compartment to the rear of said driver's seat, an internal combustion engine positioned within said engine compartment, transfer drive means at the front of said engine having an input shaft connected to the output shaft of said engine and an output shaft offset from the engine input shaft toward said longitudinal plane, a change speed transmission drivingly coupled to said output shaft of said transfer drive means and offset from the engine toward said longitudinal plane, a differential for transmitting power to the forwardmost pair of said wheels, said differential being positioned contiguous to the rear of said engine, a drive shaft interconnecting the output shaft of said change speed transmission with an input shaft of said differential, a substantially frameless refuse compartment defined by sheet metal walls defining a refuse storage volume to the rear of said engine and passenger compartments having a transverse cross-sectional configuration made up of two interconnected rectangular segments, said segments being vertically disposed with respect to each other, the lowermost of said segments being narrower than the uppermost of said segments, said lowermost segment being disposed at least in part between the rearwardmost pair of said wheels, the uppermost of said segments overlying at least in part said rearwardmost wheels, a combined reaction and ejection member positioned within said refuse compartment, said ejection member having a shape complementary to the shape of said refuse compartment, said refuse compartment being provided with longitudinally extending guide rails at opposite sides thereof, supporting means at each side of said ejection member engaging said guide rails for guiding said ejection member longitudinally of said storage compartment, preventing bowing of said side walls and precluding tilting of said ejection member, said supporting means comprising a supporting member extending substantially parallel to the respective guide rail and bearing members at opposite ends of said supporting member for engaging said guide rail, said bearing members and said guide rails having interengaging surfaces for precluding relative movement therebetween in a direction transversely to the longitudinal axes of said refuse compartment, telescopic actuating means comprised of two relatively movable elements for moving said ejection member longitudinally of said refuse storage compartment, at least one of said elements being contained within said engine compartment, and means operatively connecting the other of said elements with said ejection member.

31. A refuse vehicle as set forth in claim 30 wherein the refuse compartment is supported upon the rearwardmost pair of wheels by suspension means and said rearwardmost wheels are driven by auxiliary power means, the suspension means for each of said rearwardmost wheels comprising a trailing link, means supporting one end of said trailing link for pivotal movement about a first axis disposed beneath the lowermost surface of the lower segment of the refuse compartment, means for supporting a wheel carrying a drum at the other end of said trailing link for rotation about a second axis and resilient means for cushioning pivotal movement of said trailing link about said first axis, said auxiliary power means comprising flange means formed on each of said drums at one side thereof, internal gear means formed on said flange means, a driving pinion enmeshed with said internal gear means, the axis of rotation of said driving pinion being coaxial with said first axis for continuous engagement of said driving pinion with said internal gear upon jounce and rebound of the suspended wheel and an auxiliary motor for driving said driving pinion.

32. A refuse vehicle as set forth in claim 31 wherein the telescopic actuating means is comprised of a hydraulic cylinder element and a hydraulic piston element, said hydraulic cylinder element being pivotally supported within the engine compartment and one end of the hydraulic piston element is pivotally connected to the ejection member, the auxiliary motor for each of the rearwardmost wheels comprising a hydraulically operated motor and further including an accessory hydraulic pump driven by the engine and conduit means for interconnecting said hydraulic pump with said hydraulic cylinder element and said hydraulically operated motors.

33. A compact self-propelled refuse vehicle comprising pairs of wheels, suspension means supporting each of said pairs of wheels contiguous to a respective end of said vehicle, body structure defining an engine compartment and a driver's compartment at the forward end of said vehicle, said engine compartment lying on one side of a longitudinal plane of said vehicle and said driver's compartment lying on the opposite side of said longitudinal plane, said driver's compartment being positioned adjacent said engine compartment, said engine compartment and said driver's compartment overlying the forwardmost of said pairs of wheels and extending forwardly therefrom for the major portion of their length, drive means in said engine compartment for driving the forwardmost pair of wheels, means defining a refuse compartment at the rear of said engine compartment and said driver's compartment, said refuse compartment extending from a point between the forwardmost pair of wheels to a point at the rear of the rearwardmost pair of wheels, said refuse compartment being made up of two sections, the first of said refuse compartment sections overlying at least in part said pairs of wheels, the second of said refuse compartment sections being disposed at least in part below the tops of said pairs of wheels and terminating at its lower end contiguous to the axes of rotation of said pairs of wheels, the rear end of said refuse compartment being open, and a loading and compacting device is supported adjacent said open end for loading and compacting refuse into said refuse compartment.

References Cited

UNITED STATES PATENTS

| | | | |
|---|---|---|---|
| 2,837,230 | 6/1958 | Herterich | 214—83.3 XR |
| 1,242,682 | 10/1917 | Goodrich. | |
| 1,769,939 | 7/1930 | Berasi | 214—82 |
| 1,908,899 | 5/1933 | Kayel | 214—82 XR |

(Other references on following page)

| | | | | | |
|---|---|---|---|---|---|
| 2,218,121 | 10/1940 | Paiement | 214—82 | | |
| 2,845,133 | 7/1958 | Norrie et al. | 180—89 XR | | |
| 3,049,250 | 8/1962 | Dempster et al. | 214—82 | | |
| 3,145,044 | 8/1964 | Harrison et al. | 296—23 | | |
| 3,161,305 | 12/1964 | Ferrari et al. | 214—82 | | |
| 3,175,708 | 3/1965 | Felts | 214—82 | | |
| 3,247,984 | 4/1966 | Gregory et al. | 214—82 | | |
| 2,800,234 | 7/1957 | Herpich et al. | 214—82 | | |
| 3,229,618 | 1/1966 | O'Connor. | | | |
| 3,229,622 | 1/1966 | French et al. | 214—82 XR | | |
| 3,229,832 | 1/1966 | Ferrari et al. | 214—83.3 | | |

ALBERT J. MAKAY, Primary Examiner

U.S. Cl. X.R.

180—42, 89; 214—83.3

PO-1050
(5/69)

UNITED STATES PATENT OFFICE
CERTIFICATE OF CORRECTION

Patent No. 3,486,646            -Dated December 30, 1969

Inventor(s) Angus J. O'Brien and John McCarthy

It is certified that error appears in the above-identified patent and that said Letters Patent are hereby corrected as shown below:

| | |
|---|---|
| Column 2, line 3, | "constrruction" (first occurrence) should be -- construction --. |
| Column 2, line 34, | "area" should be -- areas --. |
| Column 3, line 45, | "pane" should be -- plane --. |
| Column 3, line 62, | "eengine" should be -- engine --. |
| Column 4, lines 9-10, | "compartmeents" should be -- compartments --. |
| Column 4, line 14, | "haults" should be -- hauls --. |
| Column 8, line 51, | "previous" should be -- previously --. |
| Column 10, line 35, | "relaitonship" should be -- relationship --. |
| Column 10, line 47, | "is" should be -- its --. |
| Column 11, line 58, | "or" should be -- of --. |
| Column 12, line 7, | "aid" should be -- said --. |
| Column 15, line 58, | "continguous" should be -- contiguous --. |
| Column 17, line 45, | "campact" should be -- compact --. |
| Column 20, line 13, | delete "a" (second occurrence). |

SIGNED AND SEALED

JUN 23 1970

(SEAL)
Attest:

Edward M. Fletcher, Jr.
Attesting Officer

WILLIAM E. SCHUYLER, JR.
Commissioner of Patents